(12) United States Patent
Dadlani Mahtani et al.

(10) Patent No.: US 8,812,634 B2
(45) Date of Patent: Aug. 19, 2014

(54) SYSTEM AND METHOD FOR COPYING LIGHT SETTINGS BETWEEN LAMPS

(75) Inventors: Pavankumar Murli Dadlani Mahtani, Eindhoven (NL); Robert Van Herk, Dordrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 446 days.

(21) Appl. No.: 13/133,162

(22) PCT Filed: Nov. 27, 2009

(86) PCT No.: PCT/IB2009/055375
§ 371 (c)(1),
(2), (4) Date: Aug. 24, 2011

(87) PCT Pub. No.: WO2010/067246
PCT Pub. Date: Jun. 17, 2010

(65) Prior Publication Data
US 2011/0302282 A1 Dec. 8, 2011

(30) Foreign Application Priority Data

Dec. 8, 2008 (EP) .................................... 08170901

(51) Int. Cl.
*G06F 15/177* (2006.01)
*G06F 15/173* (2006.01)
*G06F 15/16* (2006.01)

(52) U.S. Cl.
USPC ............ 709/221; 709/222; 709/223; 709/229

(58) Field of Classification Search
None
See application file for complete search history.

(56) References Cited

U.S. PATENT DOCUMENTS

| 6,528,954 | B1 | 3/2003 | Lys et al. | |
|---|---|---|---|---|
| 2005/0149626 | A1* | 7/2005 | Manchester et al. | 709/220 |
| 2006/0250980 | A1 | 11/2006 | Pereira et al. | |
| 2007/0115139 | A1* | 5/2007 | Witte et al. | 340/909 |
| 2007/0224938 | A1* | 9/2007 | Jung et al. | 455/41.2 |

FOREIGN PATENT DOCUMENTS

| WO | 0213490 A2 | 2/2002 |
|---|---|---|
| WO | 2004057927 A1 | 7/2004 |
| WO | 2006095316 A1 | 9/2006 |
| WO | 2007095740 A1 | 8/2007 |
| WO | 2007102097 A1 | 9/2007 |
| WO | 2007125477 A2 | 11/2007 |
| WO | 2008001267 A2 | 1/2008 |

* cited by examiner

*Primary Examiner* — John B. Walsh
(74) *Attorney, Agent, or Firm* — Yuliya Mathis

(57) ABSTRACT

The invention relates to copying of settings of a device to another device so that a user does not have to set up each device of a network of devices, such as to set up each lamp of a lighting system with a network of lamps. A basic idea of the invention is to equip a device such as a lamp with a network transmitter and receiver with a form of proximity detection in order to enable a user to easily copy the settings of one device to another device within their proximity. An embodiment of the invention provides a system for copying settings of one device to another device, comprising
a network transmitter (10) coupled to a first device (12),
a network receiver (14) coupled to a second device (16), wherein
the network transmitter and the network receiver may establish a network connection (18) if their distance is essentially equal or less than a predetermined distance (20),
the network transmitter is adapted to read device settings of the first device and to transmit the read device settings over the established network connection, and
the network receiver is adapted to receive the device settings, being transmitted by the network transmitter over the established network connection, and to configure the second device in accordance with the received device settings.

6 Claims, 2 Drawing Sheets

SYSTEM AND METHOD FOR COPYING LIGHT SETTINGS BETWEEN LAMPS

FIELD OF THE INVENTION

The invention relates to copying of settings of a device to another device so that a user does not have to set up each device of a network of devices, such as to set up each lamp of a lighting system consisting of a network of lamps.

BACKGROUND OF THE INVENTION

Modern lighting systems usually comprise a large number of lamps or light units. The lamps of these lighting systems typically have a number of parameters, which may be configured by a user, for example the intensity, color, etc. An example of such a configurable lamp is the LivingColors™ lamp of the Applicant. The LivingColors™ lamp comprises a radio remote control, which enables a user to comfortably set up the lighting color and intensity. In a lighting system with several LivinColors™ lamps, it may be tedious and cumbersome for the user to set up each one of a plurality of LivingColors™ lamps, particularly to adjust the lighting color of each lamp so exactly that it matches the user preferences.

U.S. Pat. No. 6,528,954 B1 relates to smart light bulbs, which comprise a processor and at least one of a transmitter and a receiver. The processor may control the color and intensity of the illumination source of a smart light bulb. By means of the receiver or transmitter the smart light bulb may respond to a signal from another device or send a signal to another device, which may be a smart light bulb, too. However, these smart light bulbs are not able to relief a user from the tedious and cumbersome work of separately configuring each lamp.

SUMMARY OF THE INVENTION

It is an object of the invention to provide a system and method, which allow an easy set up of devices of a network of devices.

The object is solved by the subject matter of the independent claims. Further embodiments are shown by the dependent claims.

A basic idea of the invention is to equip a device, such as a lamp, with a network transmitter and receiver with a form of proximity detection in order to enable a user to easily copy the settings of one device to another device within their proximity Thus, a user must not set up each device separately, but needs to set up only one device, and may copy the settings of this device to all other devices with a relatively simple and comfortable procedure comprising bringing both devices, i.e. the set-up device and the device to set-up, in close proximity. The process of transmitting the device settings of the set-up device to the device to be set-up via a network transmitter and receiver may be automatically initiated, for example when a device with a receiver detects a device with a transmitter in its neighborhood, or it may be manually launched, for example by pressing a "device settings copy"-button on one or both devices, for example by pressing a "copy"-button on a first device, from which the settings should be copied, and by pressing a "copy"-button on a second device, to which the settings of the first device should be copied.

An embodiment of the invention provides a system for copying settings of one device to another device, particularly for copying settings between lamps, comprising
 a network transmitter coupled to a first device,
 a network receiver coupled to a second device, wherein
 the network transmitter and the network receiver may establish a network connection if their distance is essentially equal or less than a predetermined distance,
 the network transmitter is adapted to read device settings of the first device and to transmit the read device settings over the established network connection, and
 the network receiver is adapted to receive the device settings, being transmitted by the network transmitter over the established network connection, and to configure the second device in accordance with the received device settings. In order to estimate the distance between two devices, for example the signal strength of a signal of a device or the round-trip-time of a signal transmitted from a device and sent back to that device may be measured. The devices may be particularly lamps of a networked lighting system, such as the LivingColor™ lamps of the Applicant. The system may be for example offered as a kit for equipping lamps with, for example existing LivingColors™ lamps. Alternatively, the system may also be integrated in devices or lamps, for example as a new feature.

According to a further embodiment of the system,
 the network transmitter may be part of a first network transceiver and may be adapted to transmit a search signal for a network receiver,
 the network receiver may be part of a second network transceiver and may be adapted to send a response signal in response to the receipt of a search signal from the first network transceiver, and wherein
 the first network transceiver may be adapted to automatically establish the network connection with the second network transceiver upon receipt of the response signal. This allows a very flexible application of the network transceivers since each transceiver may comprise a transmitter and receiver according to the invention, so that a network transceiver coupled to a device may be either used for configuring the device with received device settings or transmit the device settings of the devices, with which it is coupled.

In a further embodiment the system may be characterized by one or more of the following:
 the second network transceiver may be adapted to communicate the capabilities of the second device over the established network connection to the first network transceiver, which is adapted to compare the received capabilities of the second device with the capabilities of the first device and to decide which device settings of the first device to transmit over the established network connection;
 the first network transceiver may be adapted to communicate the capabilities of the first device over the established network connection to the second network transceiver, which is adapted to compare the received capabilities of the first device with the capabilities of the second device and to request which device settings of the first device to transmit over the established network connection.

In the first alternative, the first network transceiver may compare the received capabilities of the second device with the capabilities of the first device and determine which device settings of the first device may be applied to the second device. For example, if the first network transceiver indentifies by checking the received capabilities that the second device does not have all capabilities of the first device, it may decide to transmit only a subset of the capabilities of the first device to the second device, which may be processed by the second device. Also, the first transceiver may decide not at all to transmit any device settings, if the second device is not able to process the device settings of the first device, because it is for example incompatible or does not have any of the capabilities of the first device. According to the second alternative, the second network transceiver does the comparison and decides which settings should be transmitted from the first network transceiver by requesting the settings to be transmitted from the first network transceiver.

The system may be further adapted to receive a signal initiating a device settings copying procedure from a remote control according to an embodiment of the invention. Thus, a user may explicitly and comfortably initiate the copying of device settings from one device to another device. For example, the user adjusts the device settings of one device with her/his remote control, and then after finishing the configuration initiates a copy of the device settings to one or more other devices in the neighborhood of the adjusted device.

The network transmitter and the network receiver may be adapted to establish a short range radio network connection of about a meter in an embodiment of the invention. This allows applying special short range radio modules such as Bluetooth® or ZigBee™ radio communication modules, which do not require much power and are able to quickly establish network connections with communication partners.

According to a yet further embodiment of the invention, the network transmitter may be adapted to periodically broadcast the read device settings and the network receiver may be adapted to receive the broadcast device settings from the transmitter and to configure the second device in accordance with the received device settings.

Another embodiment of the invention relates to a device settings network transceiver comprising
  an interface for coupling the network transceiver with a device and for transmitting device settings over the interface,
  a processor for reading out device settings of the device, with which the network transceiver is coupled, over the interface and for configuring the device, with which the network transceiver is coupled, in accordance with received device settings over the interface, and
  a communication unit for establishing a network connection with another network transceiver, if the distance between both transceivers is essentially equal or less than a predetermined distance and to transmit and receive device settings over the established network connection to or from the other network transceiver. The transceiver may be for example implemented as a separate module, which may be coupled to an existing device, or even integrated in a device. For example, an embodiment of the device settings network transceiver may be a kind of remote control, which may be wirelessly coupled to a device such as by a pairing procedure. After the coupling, the transceiver may read the device settings into an internal memory, and transmit the stored device settings to all lamps, which are located in the neighborhood and the range of the transceiver. A user may start the device settings copying procedure by pressing a button on the transceiver. This may cause the transceiver to transmit its search signal for devices in the neighborhood.

The transceiver may further comprise in an embodiment of the invention
  a remote control unit module for receiving and processing commands from a remote control unit. This embodiment may for example be provided as a kind of separate box, which may be coupled to a device, and be controlled with a remote control. For example a user may connect the transceiver with a device settings interface of the device, and then control the behavior of the transceiver with a remote control, such as copying the device settings to other devices, or receiving device settings from another device and configuring the connected device with the received device settings.

In another embodiment of the invention, the transceiver may comprise a button for initiating a device settings copying procedure. Thus, a user may initiate the setting copying procedure without any remote control.

The invention also provides in an embodiment a device comprising a device settings network transceiver of the invention and as described before. The transceiver may be integrated in the device enhancing the functionality of the device.

Another embodiment of the invention provides a method for copying device settings of one device to another device, particularly for copying settings between lamps, comprising
  establishing a network connection between a first and a second device if the distance of the devices is essentially equal or less than a predetermined distance,
  reading device settings of the first device and transmitting the read device settings over the established network connection,
  receiving the device settings over the established network connection by the second device, and
  configuring the second device in accordance with the received device settings. The method may be for example implanted as control software of a control unit of a device, or a transceiver as described before.

According to a further embodiment of the invention, the method may comprise the steps of
  transmitting a search signal for a second device by the first device,
  sending a response signal from the second device in response to the receipt of the search signal from the first device, and
  establishing the network connection between the devices upon receipt of the response signal.

According to a further embodiment of the invention, a computer program may be provided, which enables a processor to carry out the above method according to the invention. For example, a user may extend the functionality of an existing computer controlled lighting system by adding the computer program to the existing control program of the lighting system.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

A further embodiment of the invention provides a computer programmed to perform a method according to the invention such as a PC (Personal Computer), which may comprise an interface for coupling with a device. The computer may be for example applied as control unit for a complex lighting system with a plurality of lamps, for example in the home, in a shop, an office, a hotel lobby, etc. Available communication capabilities of the computer such as wireless network modules may be used for implementing the invention, such as establishing a network connection for transmitting lamp settings with a wireless communication module of the computer with another computer connected to another lamp. Thus, a standard computer programmed by software implementing the method according to the invention and as described before may act as a lamp settings network transceiver according to the invention and as described before. This allows users to connect existing standard PCs via the interface to existing lamps, and to copy settings from one lamp to another lamp in for example a home lighting system.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
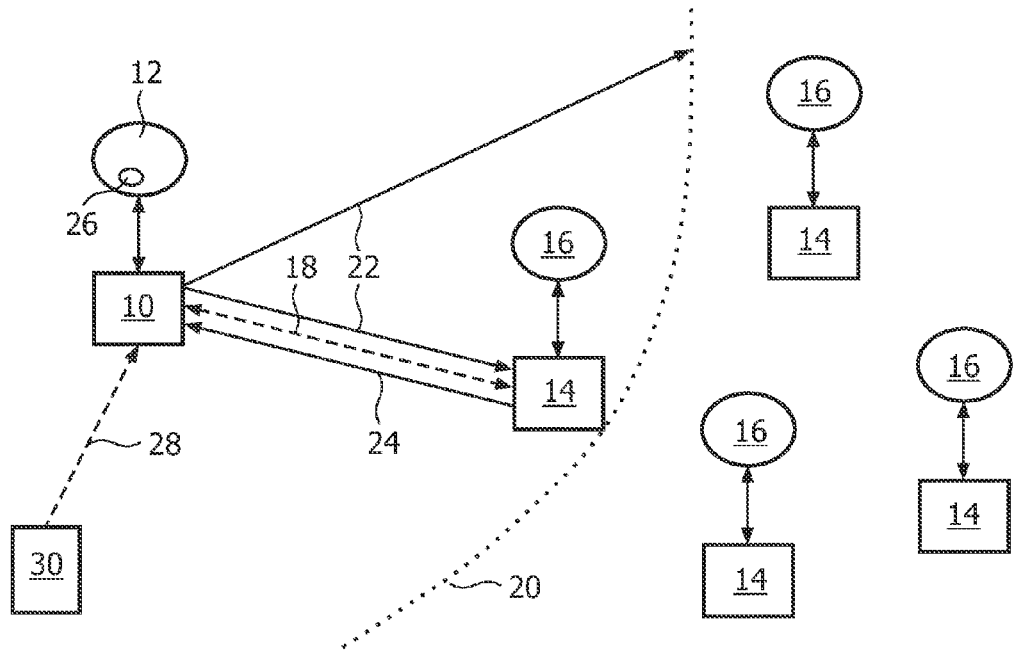
FIG. 1 shows an embodiment of a system for copying settings of one lamp to another lamp according to the invention.

In the following, functionally similar or identical elements may have the same reference numerals. In the following description of embodiments, a device is a lamp of a lighting system, which forms a network of particularly wireless lamps as network devices. However, the invention is not limited to be applied to lighting systems, but may be used with any kind of devices, wherein the devices may be not only lamps but also control devices, sensors, actuators or the like of a networked control system such as a home automation system.

FIG. 1 shows a lighting system comprising of first lamps 12 and several second lamps 16. The lamps 12 and 16 may be for example similar to the LivingColors™ lamp of the Applicant, as mentioned before. The lighting created by the first lamp 12 is adjusted as preferred by a user. The lighting comprises the lighting intensity and color. The first lamp 12 is coupled to a first network transceiver 10, which is adapted to set-up and configure the first lamp 12 and to read the settings of the first lamp 12. A remote control 30 can transmit control signals 28 via a wireless communication connection to the first network transceiver 10. With the remote control 30, a user can adjust settings of the first lamp 12 and initiate a copy of the settings of the first lamp 12 to one of the second lamps 16. The copying may also be initiated by a user by pressing a button 26 on the first lamp 12.

The first network transceiver 10 is adapted to copy settings of the first lamp 12 to a second lamp 16, which is located in the neighborhood of the first network transceiver 10. The neighborhood is defined by a predefined distance 20 from the first network transceiver 10. The predefined distance 20 is defined by the range of wireless signals transmitted from the first network transceiver 10 and may be estimated by measuring the signal strength of a received signal or the round-trip-time of a signal. Typically, a short range radio communication unit is integrated in the first network transceiver 10 such as a Bluetooth® or ZigBee™ or the like radio communication unit. All second network transceivers 14, which are not located within the range of the first network transceiver 10, cannot establish a network connection 18 with the first network transceiver 10, over which settings of the first lamp 12 may by copied to one of the second lamps 16.

When a user initiates a settings copying process either via the remote control 30 or by pressing the button 26 on the first lamp 12, the first network transceiver 10 is initiated to transmit a search signal 22 like a broadcast search signal. The search signal 22 may comprise at least one of the following information: an identification of the first network transceiver 10; an identification of the first lamp 12; information about the lighting capabilities of the first lamp 12. Each second network transceiver 14, which is located within the range 20 of the search signal 22 from the first network transceiver 10, may return a response signal 24 to the first network transceiver 10 as response to the receipt of the search signal 22. The response signal 24 may comprise at least one of the following information: an identification of the first network transceiver 10; an identification of the first lamp 12; an identification of the second network transceiver 10; an identification of the second lamp 12; information about the lighting capabilities of the second lamp 12. The identification of the first and second network transceivers may serve as kind of addresses for establishing a network connection 18 between both transceivers 10 and 14. The first network transceiver 10 may upon receipt of the response signal 24 from the second network transceiver 14 establish the network connection 18, read the settings from the first lamp 12, and transmit the read settings over the established network connection 18 to the second transceiver 14. The second network transceiver 14 configures the second lamp 16 in accordance with received settings of the first lamp 12 so that both lamps 12 and 16 create an at least similar lighting and frees the user from manually setting-up and configuring the second lamp 16.

Figure 2:
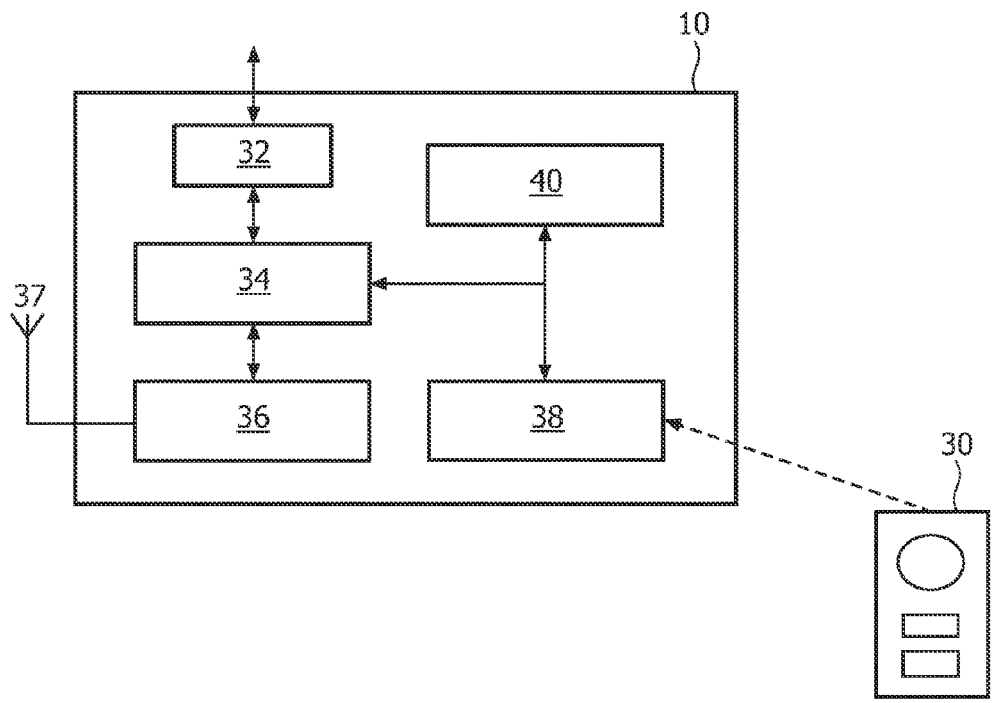
FIG. 2 shows an embodiment of a lamp settings network transceiver according to the invention.

FIG. 2 shows an implementation of the network transceiver 10 in detail. The transceiver 10 comprises a processor 34, for example a microcontroller being programmed to perform a method as will be described later, an interface 32 for coupling the network transceiver with a lamp and for transmitting lamp settings over the interface, for example a wired or wireless communication unit for coupling with a corresponding communication unit of the lamp and establishing a connection, over which the lamp settings may be transmitted, and a communication unit 36 with an antenna 37, for example a ZigBee™ communication module, with which a wireless short range network connection with a radius of about one meter around the module may be established with another ZigBee™ communication module. The transceiver further comprises a remote control unit module 38, for example a receiver for wireless command from a remote control 30. The remote control unit module 38 is connected with the processor, so that the processor may process received commands. Also, a internal memory 40 is provided, in which the processor 34 may (temporarily) store settings of a lamp read via the interface 32, or received commands from the remote control 30, or the like.

Figure 3:
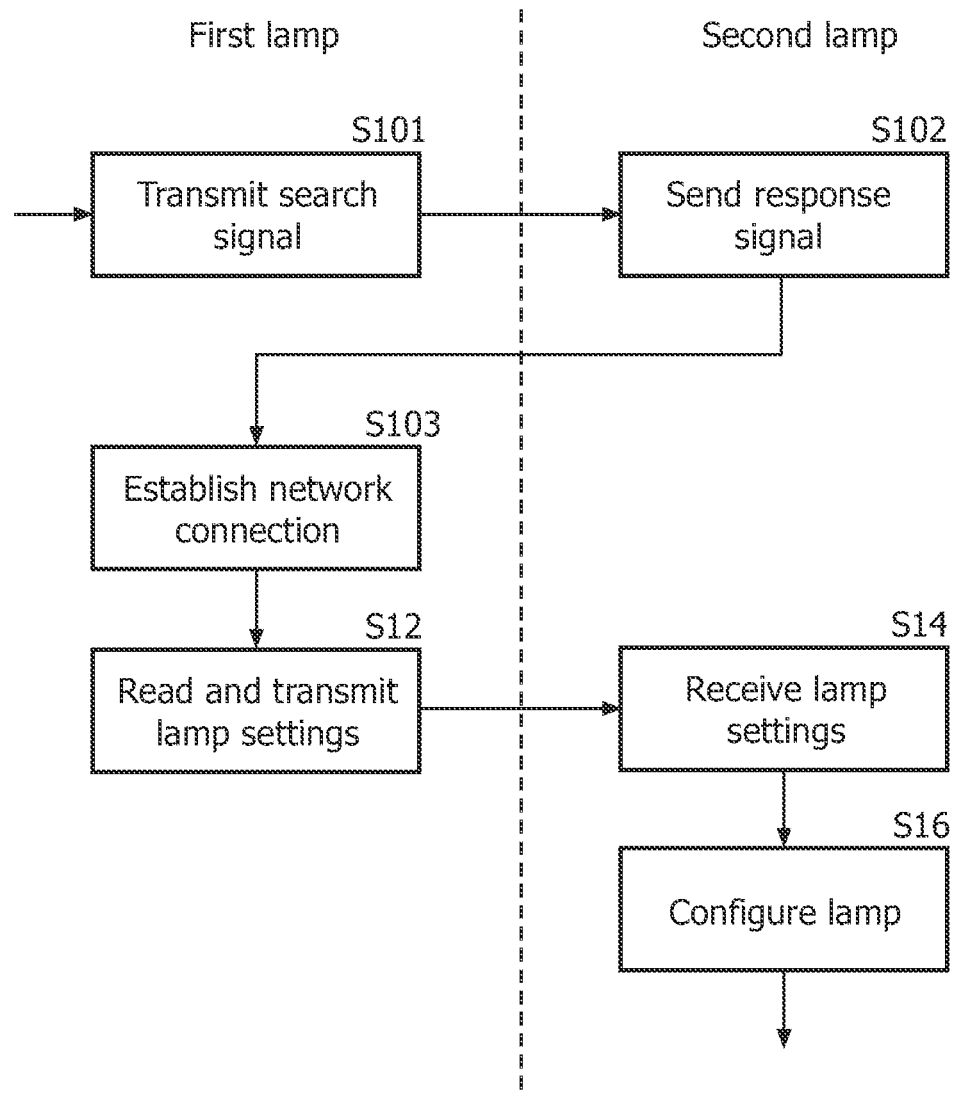
FIG. 3 shows an embodiment of a flow chart of method for copying settings of one lamp to another lamp according to the invention.

The transceiver 10 works as explained in the following by means of an example: the transceiver 10 is coupled via the interface 32 with a lamp (refer to FIG. 1). A user may instruct via the remote control 30 the transceiver to copy settings of the coupled lamp to another lamp, which is located in the receiving range of the communication unit 36 of the transceiver 10. Thus, upon receipt of the command for copying settings from the remote control 30 via the remote control unit module 38, the processor 34 executes a program for performing the copying procedure. The flowchart of a typical implementation of this program is shown in FIG. 3.

First, the processor 34 executes step S101 and instructs the communication unit 36 to transmit via the antenna 37 a search signal for a lamp in the neighborhood and to switch into a receive or listening mode for any response signals. Any lamp, which is coupled with a transceiver for the search signal and is within the receiving range of the short range search signal, may upon receipt of the search signal reply with a response signal in step S102. It should be noted that the responding lamp or transceiver, respectively, may be operated in a listening mode, in which they listen to any search signal from another lamp's transceiver. Also, the search signal may comprise a unique identifier of the sending transceiver 10 and some other information as described above. The response signal from the responding lamp or transceiver may also comprise a unique identifier in order to allow establishing a point-to-point-network connection by the communication unit 36 in step S103. When the communication unit 36 receives a response signal via the antenna 37, it forwards the data contained in the response signal such as the unique identifier of the responding transceiver or lamp to the processor. Then, the processor performs step S14, in which the settings of lamp are read, to which the transceiver 10 is coupled via the interface 32. The processor then instructs the communication unit 36 to transmit the read settings via the antenna with the unique identifier of the responding lamp or transceiver as address over the established network connection, i.e. to upload the settings of the lamp to the other lamp in order to copy the settings. The addressed lamp or transceiver, which receives the settings in step S14, then configures the lamp in step S16. It should be noted that the transceiver 10 shown in FIG. 2 may be implemented in the second lamp, which receives the copied settings.

It should be noted that the copying procedure may be not only triggered by a user by pressing a button on the remote control 30 or the lamp or transceiver, from which the settings are upload to another lamp, but it may be triggered also automatically without any user interaction by a mere proximity detection. In such case, the communication unit 36 may be operated in a combined sending and listening mode, i.e. it may periodically send out search signals for searching other lamps in its neighborhood, and may periodically be switched in a listening mode, in which it is able to receive any search signals from other lamps in its neighborhood. When the transceiver 10 detects any search signal or any response signal, the processor 34 may automatically initiate a settings download or upload procedure. This sending and listening mode may also be activated by the user, for example when the user wishes to reconfigure a lighting system or has acquired a new lamp, which should be integrated in an existing lighting system.

In an application of the invention, every lamp in a lighting system may be equipped with a (wireless) network transceiver with a form of proximity detection, for instance, a network transceiver that only works within short range, of about a meter. The network could be simple and single hop, because only lamps directly in each other's proximity should be able to communicate. This may also help in keeping the costs for the system low. When a lamp $l_1$ that already has parameters assigned to it is put close to a lamp $l_2$ with similar capabilities in this lighting system, $l_1$ may upload its parameters to $l_2$. Thus, whenever the user places a new lamp close to another similar lamp, settings may be copied. The lamps may be also equipped with a button so that the user can indicate that he wishes to upload the settings to the other lamp in its proximity. Of course, there should be a mechanism in place for the lamps to communicate over the network interface what their capabilities are. A typical usage scenario may be as follows:

A user has a LivingColors™ lamp $l_1$ in his living room, set to a particular color. It took him quite some time to select a color that matches his exact wishes. In a futuristic setup, he may even have multiple lighting atmospheres available and he may have selected a color to his exact wishes for every of these atmospheres. Now the user buys another LivingColors™ lamp $l_2$. Of course, he is not looking forward to having to undergo the same cumbersome process for this lamp as well. However, according to this invention, he only has to put this lamp $l_2$ close $l_1$ to and press a button to share the settings. To his relief, all the settings are then automatically copied and his new lamp behaves exactly as the old lamp did.

The invention can be applied for commissioning lamps of a lighting system, for example a lighting system at home, in a shop and in office applications. It is particularly suitable for the easy set-up of lamps. The invention can be offered for example as a kit including a remote control, a set of tags and receivers, which users can equip lamps with.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A system for copying settings between lamps, the system, comprising
   a network transmitter coupled to a first lamp,
   a network receiver coupled to a second lamp,
   wherein the network transmitter and the network receiver are configured to establish a network connection if a distance therebetween is equal or less than a predetermined distance, and
   wherein the network transmitter is configured to read settings of the first lamp including intensity and color and to transmit said settings over the established network connection,
   the network receiver is configured to receive said settings, and to configure the second lamp in accordance therewith,
   the network transmitter is part of a first network transceiver and is adapted to transmit a search signal for a network receiver,
   the network receiver is part of a second network transceiver and is adapted to send a response signal in response to the receipt of a search signal from the first network transceiver, and wherein
   the first network transceiver is adapted to automatically establish a network connection with the second network transceiver upon receipt of the response signal,
   the second network transceiver is adapted to communicate the capabilities of the second lamp over the established network connection to the first network transceiver, which is adapted to compare the received capabilities of the second lamp with the capabilities of the first lamp and to decide which settings of the first lamp to transmit over the established network connection;
   the first network transceiver is adapted to communicate the capabilities of the first lamp over the established network connection to the second network transceiver, which is adapted to compare the received capabilities of the first lamp with the capabilities of the second lamp and to request which settings of the first lamp to transmit over the established network connection.

2. The system of claim 1, further being adapted to receive a signal initiating a settings copying procedures from a remote control.

3. The system of claim 1, wherein the network transmitter and the network receiver are adapted to establish a short range radio network connection.

4. The system of claim 1, wherein the network transmitter is adapted to periodically broadcast the read settings and the network receiver is adapted to receive the broadcast settings from the transmitter and to configure the second lamp in accordance with the received settings.

5. A method for copying settings of one lamp to another lamp, comprising
   establishing a network connection between a first and a second lamp if the distance of the lamp is essentially equal or less than a predetermined distance,
   receiving by the first lamp a list of capabilities from the second lamp and comparing the capabilities of the second lamp with a list of capabilities of this first lamp,
   reading lamp settings of the first lamp and transmitting the read lamp settings over the established network connection,
   receiving the lamp settings over the established network connection by the second lamp,
   configuring the second lamp in accordance with the received lamp settings;
   determining by the first lamp if the list of capabilities of second lamp are compatible with the list of capabilities of the first lamp and limiting transmitted settings of the read lamp settings to a subset of the read lamp settings matching the list of capabilities of the second lamp.

6. The method of claim 5, further comprising the steps of
   transmitting a search signal for a second lamp by the first lamp,
   sending a response signal from the second lamp in response to the receipt of the search signal from the first lamp, and
   establishing the network connection between the lamps upon receipt of the response signal.

* * * * *